United States Patent
Navarro et al.

(10) Patent No.: US 10,952,162 B2
(45) Date of Patent: *Mar. 16, 2021

(54) METHOD AND SYSTEM FOR WIRELESS POWER DELIVERY

(71) Applicant: Supply, Inc., Emeryville, CA (US)

(72) Inventors: Gustavo Navarro, Emeryville, CA (US); Varun Ramaswamy, Emeryville, CA (US); Christopher Joseph Davlantes, Emeryville, CA (US)

(73) Assignee: Supply, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,408

(22) Filed: Sep. 23, 2020

(65) Prior Publication Data

US 2021/0007062 A1 Jan. 7, 2021

Related U.S. Application Data

(63) Continuation of application No. 16/715,266, filed on Dec. 16, 2019, which is a continuation of application
(Continued)

(51) Int. Cl.
*H04W 52/36* (2009.01)
*H04W 52/06* (2009.01)
(Continued)

(52) U.S. Cl.
CPC ......... *H04W 52/367* (2013.01); *H04W 52/06* (2013.01); *H04W 52/223* (2013.01);
(Continued)

(58) Field of Classification Search
CPC . H04W 52/367; H04W 52/06; H04W 52/223; H04W 52/283; H04W 52/34; H04W 52/50
See application file for complete search history.

(56) References Cited

U.S. PATENT DOCUMENTS 6,967,462 B1 11/2005 Landis
7,424,058 B1 9/2008 Staley et al.
(Continued)

FOREIGN PATENT DOCUMENTS

CN 104702105 A 6/2015

OTHER PUBLICATIONS

Wang et al. "PROCEED: A Pareto optimization-based circuit-level evaluator for emerging devices." In: IEEE Transactions on Very Large Scale Integration (VLSI) Systems. Feb. 12, 2015.
(Continued)

*Primary Examiner* — Dominic E Rego
(74) *Attorney, Agent, or Firm* — Jeffrey Schox; Samuel Rosenthal

(57) ABSTRACT

A system for wireless power delivery including one or more transmitters and receivers. A method for wireless power delivery, preferably including: determining transmitter-receiver proximity; determining transmission parameter values, preferably including determining initial parameter values, evaluating candidate transmission parameter values, performing one or more local optimum searches, and/or performing one or more global optimum searches; and transmitting power based on the transmission parameter values.

20 Claims, 6 Drawing Sheets

Related U.S. Application Data

No. 16/415,664, filed on May 17, 2019, now Pat. No. 10,548,099, which is a continuation of application No. 16/001,725, filed on Jun. 6, 2018, now Pat. No. 10,341,967.

(60) Provisional application No. 62/516,572, filed on Jun. 7, 2017, provisional application No. 62/515,962, filed on Jun. 6, 2017.

(51) Int. Cl.
    *H04W 52/22*     (2009.01)
    *H04W 52/28*     (2009.01)
    *H04W 52/34*     (2009.01)
    *H04W 52/50*     (2009.01)

(52) U.S. Cl.
    CPC ......... *H04W 52/283* (2013.01); *H04W 52/34* (2013.01); *H04W 52/50* (2013.01)

(56) References Cited

U.S. PATENT DOCUMENTS

| | | |
|---|---|---|
| 7,502,340 B1 | 3/2009 | Chuang et al. |
| 8,134,516 B1 | 3/2012 | Yaghjian et al. |
| 8,159,364 B2 | 4/2012 | Zeine |
| 8,175,660 B2 | 5/2012 | Porwal |
| 8,180,286 B2 | 5/2012 | Yamasuge |
| 8,338,991 B2 | 12/2012 | Von et al. |
| 8,650,418 B2 | 2/2014 | Wu |
| 8,682,318 B2 | 3/2014 | Lee et al. |
| 8,766,544 B2 | 7/2014 | Velazquez |
| 8,772,967 B1 | 7/2014 | Ikriannikov et al. |
| 9,142,990 B2 | 9/2015 | Keeling et al. |
| 9,288,769 B2 | 3/2016 | Tandai et al. |
| 9,368,020 B1 | 6/2016 | Bell et al. |
| 9,425,629 B2 | 8/2016 | Kim et al. |
| 9,544,004 B2 | 1/2017 | Callaway et al. |
| 9,547,099 B2 | 1/2017 | Shih |
| 9,608,454 B2 | 3/2017 | Sankar |
| 9,622,195 B2 * | 4/2017 | Ko ....................... H04W 52/246 |
| 9,711,978 B2 | 7/2017 | Manova-Elssibony et al. |
| 9,853,486 B2 | 12/2017 | Liu et al. |
| 9,859,757 B1 | 1/2018 | Leabman et al. |
| 9,876,380 B1 | 1/2018 | Leabman et al. |
| 9,882,427 B2 | 1/2018 | Leabman et al. |
| 9,893,555 B1 | 2/2018 | Leabman et al. |
| 9,967,462 B2 | 5/2018 | Kimura et al. |
| 10,069,592 B1 | 9/2018 | Krunz et al. |
| 10,135,257 B1 * | 11/2018 | Adolf ....................... H02J 50/12 |
| 10,181,729 B1 | 1/2019 | Devaul et al. |
| 10,199,849 B1 * | 2/2019 | Bell ....................... H02J 7/025 |
| 2002/0111905 A1 | 8/2002 | Nagafuchi et al. |
| 2004/0203846 A1 | 10/2004 | Caronni et al. |
| 2005/0090287 A1 | 4/2005 | Rofougaran |
| 2005/0170788 A1 | 8/2005 | Tanaka et al. |
| 2006/0088123 A1 | 4/2006 | Jensen et al. |
| 2007/0155347 A1 | 7/2007 | Heuermann et al. |
| 2007/0156343 A1 | 7/2007 | Rayan et al. |
| 2007/0243851 A1 | 10/2007 | Shoarinejad et al. |
| 2008/0057880 A1 | 3/2008 | Copeland |
| 2008/0225639 A1 * | 9/2008 | Hongou .............. G01S 7/52052 367/13 |
| 2009/0210366 A1 | 8/2009 | Sakata et al. |
| 2009/0284082 A1 | 11/2009 | Mohammadian |
| 2010/0033021 A1 | 2/2010 | Bennett |
| 2010/0222010 A1 | 9/2010 | Ozaki et al. |
| 2010/0226448 A1 | 9/2010 | Dent |
| 2011/0141148 A1 | 6/2011 | Hill et al. |
| 2011/0148215 A1 | 6/2011 | Marzetta et al. |
| 2011/0156640 A1 | 6/2011 | Moshfeghi |
| 2011/0216564 A1 | 9/2011 | Swamy |
| 2011/0224817 A1 | 9/2011 | Dubrov et al. |
| 2011/0281535 A1 | 11/2011 | Low et al. |
| 2011/0282535 A1 | 11/2011 | Woody et al. |
| 2012/0109606 A1 | 5/2012 | Dotan et al. |
| 2012/0146425 A1 | 6/2012 | Lee et al. |
| 2012/0217818 A1 | 8/2012 | Yerazunis et al. |
| 2012/0281556 A1 | 11/2012 | Sayana et al. |
| 2012/0300592 A1 | 11/2012 | Perry |
| 2012/0313450 A1 | 12/2012 | Nam et al. |
| 2012/0326660 A1 | 12/2012 | Lu et al. |
| 2013/0043734 A1 | 2/2013 | Stone et al. |
| 2013/0066471 A1 | 3/2013 | Wang et al. |
| 2013/0113299 A1 | 5/2013 | Von et al. |
| 2014/0028110 A1 | 1/2014 | Petersen et al. |
| 2014/0028111 A1 | 1/2014 | Hansen et al. |
| 2014/0062395 A1 | 3/2014 | Kwon et al. |
| 2014/0070621 A9 | 3/2014 | Von Novak et al. |
| 2014/0106761 A1 | 4/2014 | Lee et al. |
| 2014/0133322 A1 | 5/2014 | Steer et al. |
| 2014/0139034 A1 | 5/2014 | Sankar et al. |
| 2014/0203769 A1 | 7/2014 | Keeling et al. |
| 2014/0214743 A1 | 7/2014 | Chester et al. |
| 2014/0227981 A1 | 8/2014 | Pecen et al. |
| 2014/0239305 A1 | 8/2014 | Shah et al. |
| 2014/0242918 A1 | 8/2014 | Weissman et al. |
| 2014/0361741 A1 | 12/2014 | Von et al. |
| 2014/0375253 A1 | 12/2014 | Leabman et al. |
| 2015/0123496 A1 | 5/2015 | Leabman et al. |
| 2015/0181539 A1 | 6/2015 | Aiba et al. |
| 2015/0280444 A1 | 10/2015 | Smith et al. |
| 2015/0326061 A1 | 11/2015 | Davison et al. |
| 2015/0349542 A1 | 12/2015 | Yamamoto et al. |
| 2015/0351054 A1 | 12/2015 | Immonen et al. |
| 2015/0357827 A1 | 12/2015 | Muratov et al. |
| 2015/0371771 A1 | 12/2015 | Abu Qahouq |
| 2016/0013656 A1 | 1/2016 | Bell et al. |
| 2016/0026625 A1 | 1/2016 | Walker |
| 2016/0054395 A1 | 2/2016 | Bell et al. |
| 2016/0054396 A1 | 2/2016 | Bell et al. |
| 2016/0056966 A1 | 2/2016 | Bell |
| 2016/0087686 A1 | 3/2016 | Won et al. |
| 2016/0094092 A1 | 3/2016 | Davlantes et al. |
| 2016/0099611 A1 | 4/2016 | Leabman et al. |
| 2016/0099613 A1 | 4/2016 | Bell et al. |
| 2016/0099758 A1 | 4/2016 | Bell et al. |
| 2016/0140115 A1 | 5/2016 | Walker |
| 2016/0156268 A1 | 6/2016 | Thomas et al. |
| 2016/0165545 A1 | 6/2016 | Ouchi et al. |
| 2016/0197494 A1 | 7/2016 | Kwon et al. |
| 2016/0216301 A1 | 7/2016 | Holzworth et al. |
| 2016/0233724 A1 | 8/2016 | Bae et al. |
| 2016/0337085 A1 | 11/2016 | Yu et al. |
| 2016/0344431 A1 | 11/2016 | Srirattana et al. |
| 2016/0372948 A1 | 12/2016 | Kvols |
| 2016/0379753 A1 | 12/2016 | Jang et al. |
| 2017/0025885 A1 | 1/2017 | Blakely et al. |
| 2017/0077736 A1 | 3/2017 | Leabman |
| 2017/0201289 A1 | 7/2017 | Zhang et al. |
| 2017/0222469 A1 | 8/2017 | Tustin et al. |
| 2017/0261631 A1 | 9/2017 | Donderici et al. |
| 2017/0366242 A1 | 12/2017 | Lee et al. |
| 2018/0118045 A1 | 5/2018 | Gruzen et al. |
| 2018/0131413 A1 | 5/2018 | Won et al. |
| 2018/0262060 A1 | 9/2018 | Johnston et al. |
| 2018/0349434 A1 | 12/2018 | Seidel |
| 2018/0352519 A1 | 12/2018 | Navarro et al. |
| 2018/0375340 A1 | 12/2018 | Bell et al. |
| 2019/0011523 A1 | 1/2019 | Avestruz et al. |
| 2019/0020225 A1 | 1/2019 | Kwon et al. |
| 2019/0132098 A1 | 5/2019 | Wernersson et al. |
| 2019/0296547 A1 | 9/2019 | Kelly et al. |
| 2019/0364492 A1 | 11/2019 | Azizi et al. |
| 2020/0266673 A1 | 8/2020 | Reynolds et al. |

OTHER PUBLICATIONS

Wikipedia contributors. "Power dividers and directional couplers." Wikipedia, The Free Encyclopedia. Wikipedia, The Free Encyclopedia, Mar. 1, 2020. Web. Jun. 5, 2020. (Year: 2020).

(56) References Cited

OTHER PUBLICATIONS

Brown, William C., "The history of power transmission by radio waves" IEEE Transactions on microwave theory and techniques 32, No. 9 (1984): 1230-1242.
Harrington, Roger F., "Effect of Antenna Size on Gain, Bandwidth, and Efficiency", Journal of Research of the National Bureau of Standards—D. Radio Propagation vol. 64D, No. 1, Jan.-Feb. 1960, 12 pages.
Ivrlac, Michel T., "High-Efficiency Super-Gain Antenna Arrays", 2010 International ITG Workshop on Smart Antennas (WSA 2010), 369-374.
Kumar, et al., "Memetic search in differential evolution algorithm." In:arXiv preprint. Aug. 1, 2014 Retreived from (https://arxiv.org/ftp/arxiv/papers/1408/1408.0101.pdf> entire document.

\* cited by examiner

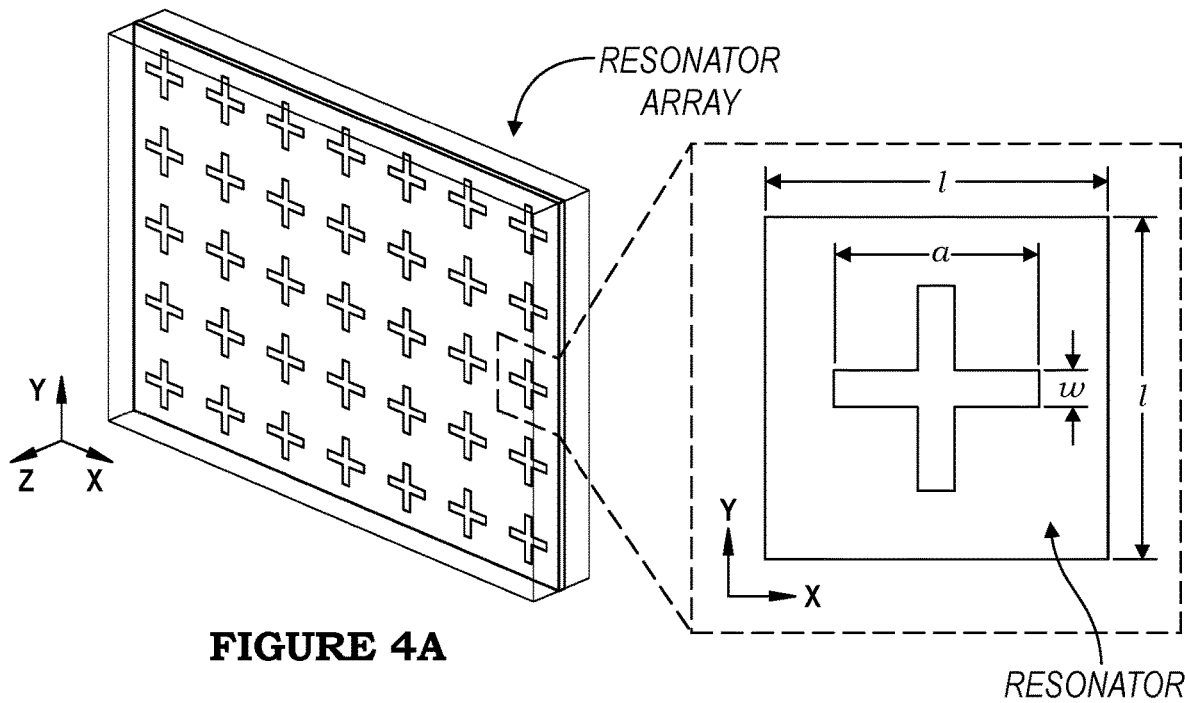
FIGURE 4A
FIGURE 4B
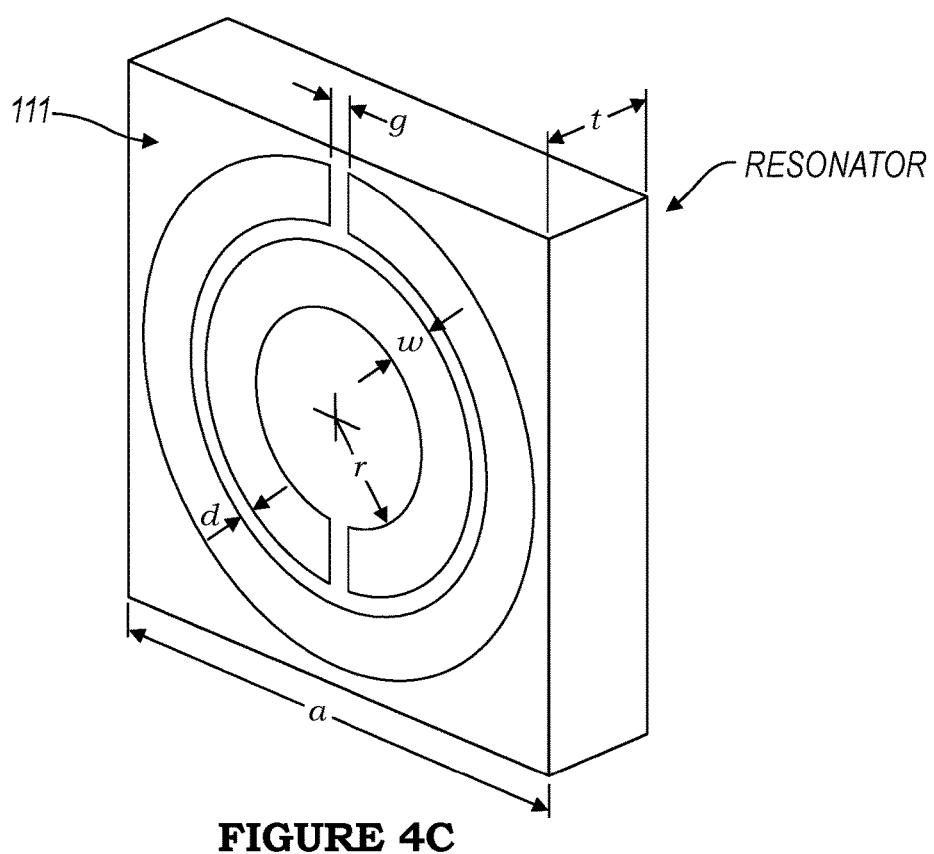
FIGURE 4C

METHOD AND SYSTEM FOR WIRELESS POWER DELIVERY

CROSS-REFERENCE TO RELATED APPLICATIONS

This application is a continuation of U.S. patent application Ser. No. 16/715,266, filed 16 Dec. 2019, which is a continuation of U.S. patent application Ser. No. 16/415,664, filed 17 May 2019, which is a continuation of U.S. patent application Ser. No. 16/001,725, filed on 06-Jun.-2018, which claims the benefit of U.S. Provisional Application Ser. No. 62/515,962, filed on 6 Jun. 2017, and U.S. Provisional Application Ser. No. 62/516,572, filed on 7 Jun. 2017, each of which is incorporated in its entirety by this reference.

TECHNICAL FIELD

This invention relates generally to the wireless power delivery field, and more specifically to a new and useful method and system in the wireless power delivery field.

BACKGROUND

Typical wireless power delivery systems restrict themselves to beamforming configurations, which may not offer high-performance results. Thus, there is a need in the wireless power delivery field to create a new and useful method and system for wireless power delivery.

BRIEF DESCRIPTION OF THE FIGURES

FIG. 4A is a perspective view of an example of an antenna.

FIG. 4B is a plan view of a cross resonator of the example of the antenna.

FIG. 4C is a perspective view of an example of a split-ring resonator.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
FIG. 1A is a schematic representation of a first embodiment of the system.
Figure 1B:
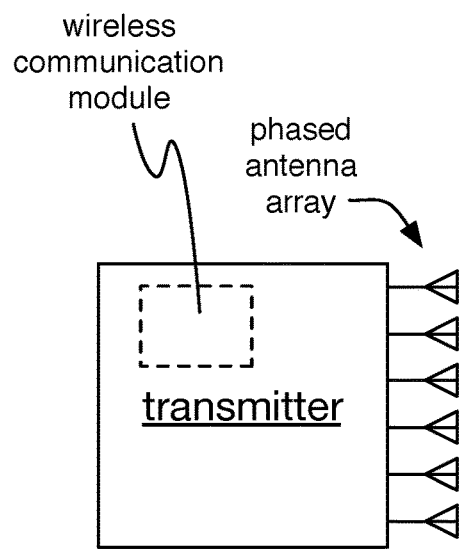
FIGS. 1B-1C are schematic representations of an example of a transmitter and receiver, respectively, of the system.
Figure 1C:
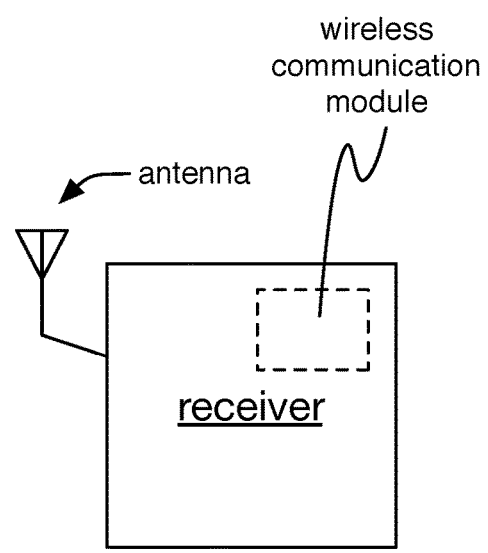
Figure 1D:
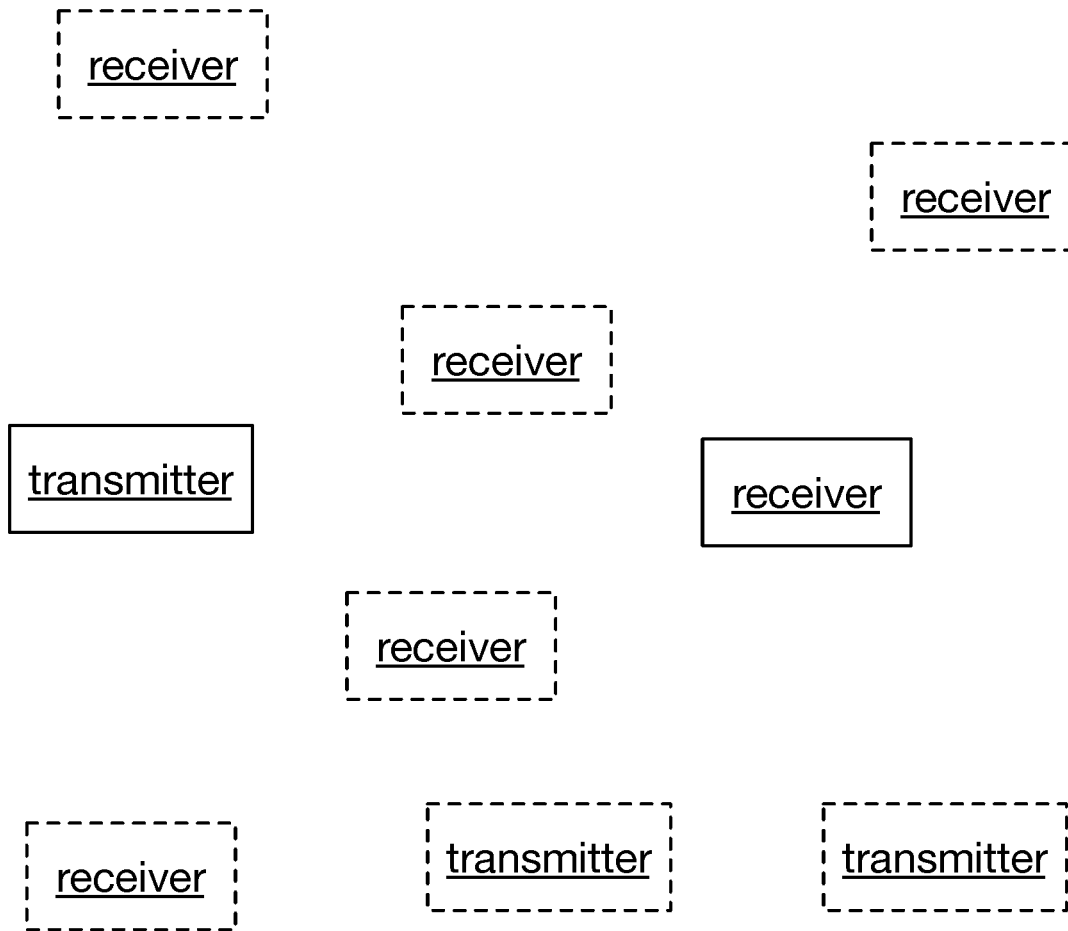
FIG. 1D is a schematic representation of a second embodiment of the system.
Figure 2A:
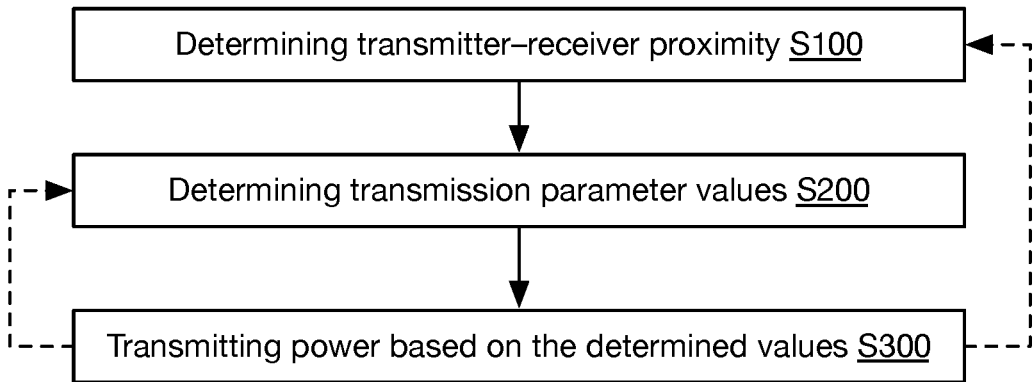
FIGS. 2A-2B are schematic representations of the method and an example of an element of the method.

A system for wireless power delivery can include one or more transmitters and receivers (e.g., as shown in FIGS. 1A-1D). A method for wireless power delivery can include determining transmitter-receiver proximity S100, determining transmission parameter values S200, and transmitting power based on the transmission parameter values S300 (e.g., as shown in FIG. 2A). However, the system and method can additionally or alternatively include any other suitable elements. The method is preferably performed using the system described above, but can additionally or alternatively be performed using any other suitable system.

Determining power transmission settings for efficient wireless power delivery using typical methods and systems can be difficult and/or time-intensive. Assessment of candidate power transmission settings can be a slow process (e.g., requiring 1-100 ms or more). In addition, the power transmission settings typically involve a large number of parameters, and so the search space can be very large, effectively precluding its full exploration. Further, the elements of the system and the surrounding element may move frequently, potentially invalidating prior solutions and necessitating a new search. In light of these problems, the inventors have discovered that a rapidly-determined solution (e.g., a solution resulting in power transmission within a threshold range of a limit or optimal result) can be superior to a globally-optimal solution found only after a lengthy search.

2. Benefits.

The method can significantly reduce the time needed to determine acceptable and/or desirable power transmission settings. First, the method can include performing a local search or stochastic global search, which can typically find a sufficient solution in much less time than a deterministic global search. This search time reduction will often produce vastly superior energy transmission results (e.g., in a system with changing element orientations).

Second, evaluation of power transmission settings (e.g., during the local and/or global searches) can be time-consuming, such as due to the need to configure the transmitter according to the settings, measure (e.g., at the receiver) the result of power transmission using the settings, and/or communicate the results between different entities (e.g., transmit results from the receiver to the transmitter). To reduce such time consumption, the method can optionally include estimating and/or caching the evaluations and/or associated information, thereby allowing fast lookup of the estimated and/or cached values in place of full evaluation.

Third, employing power transmission optimization techniques (e.g., real-time optimization techniques, such as optimization over transmission parameters based on measured results associated with the parameters) can enable excitation and/or maintenance of supergaining behavior in receiver and/or transmitter antennas, despite potential changes in environment and/or system configuration. Further, use of pure-tone (and/or substantially pure-tone) signals for power transmission can make use of such supergaining antennas feasible, despite the narrow bandwidths (e.g., fractional impedance bandwidths) typically associated with such antennas (e.g., arising from the high-energy evanescent fields typically generated in and/or around such antennas). Supergaining antennas can exhibit much higher gain than typical antennas, thereby enabling, for example, increased power transmission rates and/or decreased receiver and/or transmitter sizes. However, the method and system can additionally or alternatively confer any other suitable benefits.

3. System.

The transmitters of the system can include one or more antennas (e.g., configured to transmit electromagnetic radiation, such as RF and/or microwave power), preferably defining a controllable (e.g., adaptive) antenna array (e.g., linear array, planar array, 3-D array, etc.; phased array, electronically controllable array, etc.).

The antenna array preferably includes a plurality of active antennas (e.g., antennas configured to be actively driven by feeds), more preferably independently controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via a separate IQ modulator or phase shifter for each active antenna). In a second variation, the active antennas are separated into one or more antenna groups, wherein the antennas of a group are controlled together (e.g., via a single IQ modulator or phase shifter for each group). For example, the antennas of a group can have a fixed phase offset (e.g., zero offset, such as wherein all antenna of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The antenna array can additionally or alternatively include one or more passive antennas (e.g., configured to electrically and/or resonantly couple to one or more of the active antennas, thereby altering antenna array transmission characteristics). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) in the array and/or their feeds (e.g., wherein varying the properties of one or more of the variable elements coupled to the antennas can function to control the net pattern of the array). In a specific example of this second example, an adaptive antenna array includes a single active antenna and a plurality of passive antennas, wherein one or more of the passive antennas are electrically coupled to one or more variable components. However, the transmitters can additionally or alternatively include any other suitable elements.

The receivers of the system can include one or more antennas (e.g., configured to receive electromagnetic radiation transmitted by the transmitters). The receivers can optionally include and/or be electrically coupled to (e.g., configured to deliver electrical power to) one or more client devices (e.g., batteries and/or battery-containing devices, such as smart phones and/or other electrical and/or electronic user devices). The receivers can optionally include one or more buffer energy stores (e.g., batteries), such as a battery electrically coupled between the antenna(s) and the client device (e.g., between the antenna(s) and an electrical output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receiver, etc.).

In some embodiments, some or all of the antennas of the transmitter (e.g., active antennas, passive antennas, etc.) and/or receiver include one or more tightly-coupled arrays of resonators (e.g., as shown in FIG. 4A), but can additionally or alternatively include a loosely-coupled array, a sparse array, a single resonator, and/or any other suitable antenna elements. The resonators can include resonant loops, cross-resonators (e.g., as shown in FIG. 4B), split-ring resonators (e.g., as shown in FIG. 4C), electro-inductive-capacitive resonators (e.g., as shown in FIGS. 5A-5D), other physically small resonators (e.g., small relative to their resonance wavelength), and/or any other suitable resonators. However, the resonators can be otherwise configured.

The antenna(s) can optionally include multiple arrays (and/or other resonator arrangements) arranged with different orientations, which can function to efficiently couple to radiation of different polarizations (e.g., orthogonal polarizations). In a first embodiment, an antenna includes parallel resonator layers (e.g., parallel resonator arrays), each layer having a different in-plane resonator orientation (e.g., orthogonal orientations, oriented at oblique angles, etc.). In a second embodiment, an antenna includes resonators on non-parallel planes (e.g., orthogonal planes, planes oriented at oblique angles, etc.). However, the antenna(s) can additionally or alternatively include any other suitable resonators and/or other antenna elements, and can have any other suitable arrangement. The antenna(s) can be a metamaterial or have any other suitable configuration.

The antennas of the transmitter (e.g., active antennas, passive antennas, etc.) and/or receiver can optionally include one or more supergaining antennas, supergaining arrays, arrays of supergaining antennas, and/or any other suitable structures capable or and/or configured to exhibit supergaining behavior (e.g., supergain antennas as described in Harrington, R. F. (1960), 'Effect of antenna size on gain, bandwidth, and efficiency', *J. Res. Nat. Bur. Stand* 64D (1), 1-12, which is hereby incorporated in its entirety by this reference). Supergaining structures can exhibit very high gain relative to their physical size. For example, such structures can exhibit an electrical area $A_e$, defined as $$A_e = \frac{G\lambda^2}{4\pi},$$

wherein $\lambda$ is the radiation wavelength and G is the antenna gain at that wavelength, much greater that their physical area (e.g., footprint). In a first example, in which the antenna(s) define a sub-wavelength structure (e.g., define a length scale less than the radiation wavelength), the structures can exhibit an aperture efficiency, defined as $A_e/A$, of 2-100 (e.g., 6.5-10, 10-15, 15-22, 22-35, less than 6.5, greater than 25, etc.) and a quality factor of 100-5,000,000 (e.g., 500-5000, 5000-50,000, 50,000-750,000, less than 500, greater than 750,000, etc.). In a second example, in which the antenna(s) define a super-wavelength structure (e.g., define a length scale greater than the radiation wavelength), the structures can exhibit an aperture efficiency of 1-10 (e.g., 1.5-1.6, 1.6-1.7, 1.7-1.8, 1.8-1.9, 1.9-2, 2-2.15, less than 1.5, greater than 2.15, etc.) and a quality factor of 10-5,000,000 (e.g., 50-500, 500-5000, 5000-50,000, 50,000-750,000, less than 500, greater than 750,000, etc.). However, the structures can additionally or alternatively define any other suitable aperture efficiencies and/or quality factors.

In a first variation, such structures can include one or more resonators defining geometries that include sub-wavelength features (e.g., features defining characteristic dimensions smaller than the wavelengths of radiation that the resonator is configured to resonate with efficiently), such as cross-resonators (e.g., as shown in FIG. 4B), split-ring resonators (e.g., as shown in FIG. 4C), and/or electro-inductive-capacitive resonators (e.g., as shown in FIGS. 5A-5D). In a second variation, such structures can include a discretized aperture (e.g., array of metamaterial unit cells, such as cross-resonators, split-ring resonators, and/or electro-inductive-capacitive resonators; example shown in FIG. 4A), wherein the discrete elements of the aperture are controlled (e.g., independently, separately, etc.), such as to approximate a continuous distribution across the aperture. In a third variation, such structures can include an array of classical antenna elements (e.g., patch antennas, dipole antennas, etc.) arranged to enable and/or enhance supergaining behavior (e.g., as described in M. T. Ivrlač and J. A. Nossek, "High-efficiency super-gain antenna arrays," 2010 *International ITG Workshop on SmartAntennas (WSA)*, Bremen, 2010, pp. 369-374, which is hereby incorporated in its entirety by this reference).

The transmitters and receivers can additionally or alternatively be configured to transmit and/or receive energy in any other suitable form (e.g., sonic, optical, etc.), and/or to perform any other suitable role(s). In one embodiment, all or some of the transmitters can additionally function as receivers and/or all or some of the receivers can additionally function as transmitters. For example, the system can include a plurality of equivalent devices, each of which can wirelessly transmit power to and receive power from each of the other devices.

The transmitters and receivers preferably each include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.). However, the transmitters and receivers can additionally or alternatively include any other suitable elements.

The transmitters and receivers preferably have an arbitrary and/or dynamic arrangement with respect to each other. In one example, the system includes a transmitter with a fixed position, and a plurality of receivers, each of which undergo numerous changes in position and orientation (e.g., with respect to the transmitter, each other, etc.) over time. The system can optionally be arranged in a setting in which other nearby objects (e.g., obstacles to wireless power transmission) can also have an arbitrary and/or dynamic arrangement with respect to the elements of the system. However, the system can define any other suitable arrangements.

4. Method.
4.1 Determining Transmitter-Receiver Proximity.

Determining transmitter-receiver proximity S100 can function to indicate an opportunity for wireless power delivery (e.g., from the transmitter to the receiver). For example, S100 can include determining that one or more receivers are in transmission range (e.g., a range enabling efficient power transmission, substantial power transmission, any measurable power transmission, etc.) of the transmitter. Transmitter-receiver proximity is preferably determined using wireless communication (e.g., using the wireless communication modules of the transmitter and receiver). For example, one device can determine that the other is nearby based on establishment of wireless communication between them, wireless communication signal strength (e.g., RSSI), information communicated via wireless connection, and/or any other suitable indications.

Determining transmitter-receiver proximity S100 can additionally or alternatively include optical recognition (e.g., detecting a nearby receiver in an image captured by a camera of a transmitter), receiving a user input (e.g., button press), detecting a change in wireless power delivery, and/or any other suitable elements. For example, a transmitter wirelessly transmitting power to a first receiver can detect the arrival of a second receiver based on a reduction in power delivered to the first receiver.

S100 can additionally or alternatively include determining information about the receiver and/or transmitter. The information can include device type (e.g., model, serial number, etc.), power needs (e.g., battery charge state, current power draw, etc.), likely (e.g., typical, planned, predicted, etc.) residence time in proximity, likely position stability while in proximity (e.g., stationary on table, moving in user clothing pocket, etc.), device position (e.g., based on trilateration/triangulation, optical recognition, line-of-sight proximity sensor, device IMU readings, device GPS readings, etc.), and/or any other suitable information. However, S100 can additionally or alternatively include any other suitable elements.

4.2 Determining Transmission Parameter Values.

Determining transmission parameter values S200 can function to search for transmission parameter values that can enable efficient power transmission (e.g., from the transmitters to the receivers). Transmission parameter values are preferably determined S200 in response to determining transmitter-receiver proximity S100, but can additionally or alternatively be performed at any other suitable time. The transmission parameters can include: transmission phase (e.g., relative to a reference phase, such as a transmission phase of a reference antenna) and/or transmission amplitude of one or more antennas, beamforming parameters such as beam orientation (e.g., angles describing the beam orientation, such as azimuthal angle and polar angle), supergaining excitation parameters such as supergaining receiver type, position, and/or orientation, passive antenna parameters such as resistance, capacitance, and/or inductance coupled to one or more antennas (e.g., electrical component coupling parameters), and/or any other suitable parameters. In a first example, the transmission parameters include transmission phase and/or amplitude for one or more active antennas and/or antenna groups (e.g., hardware-defined groups, software-defined groups, etc.), preferably for each active antenna of the transmitter (e.g., of the antenna array, such as the phased antenna array or other adaptive antenna array) or transmitters. In a second example, the transmission parameters include beamforming parameters associated with one or more beamforming networks (e.g., Rotman lens, Butler matrix, etc.) defined by the antennas (e.g., wherein one or more antenna groups, such as software-defined antenna groups, each define a separate beamforming network). In a third example, the transmission parameters include supergaining excitation parameters associated with one or more supergaining structures (e.g., antennas, arrays, etc.) defined by the antennas of the transmitter (e.g., wherein one or more antenna groups, such as hardware- and/or software-defined antenna groups, each define a separate supergaining structures) and/or receiver. However, the transmission parameters can additionally or alternatively include any other suitable parameters.

Determining transmission parameter values S200 can optionally include determining one or more antenna groups (e.g., software-defined antenna groups), which can be used to reduce the dimension of the transmission parameter space (e.g., a space defined by the transmission parameters, distinct from a physical space defined by object positions and/or orientations within a spatial region such as a room). For example, rather than independently controlling parameters (e.g., transmission phase and/or amplitude) associated with each active antenna, the dimension of the transmission parameter space can be reduced to parameters associated with each antenna group (e.g., transmission phase and/or amplitude, beamforming parameters, supergaining excitation parameters, etc.). In a first embodiment, the groups are predefined (e.g., based on properties of the transmitter; based on properties of fixed elements near the transmitter, such as for a transmitter installed in a fixed position; etc.). In a second embodiment, the groups are dynamically determined, such as based on statistical analysis and/or machine learning techniques (e.g., using data determined as described below, such as data associated with wireless power received at one or more receivers of the system). For example, principal component analysis and/or clustering techniques (e.g., k-means clustering, X-means clustering, spectral clustering, etc.) can be employed to determine the antenna groups (e.g., wherein highly correlated antennas and/or antenna parameters are grouped together, wherein antennas of a cluster are grouped together, etc.). However, the antenna groups can additionally or alternatively be determined in any other suitable manner, or no antenna groups can be determined.

Determining transmission parameter values S200 preferably includes performing one or more optimum searches (e.g., as described below regarding the local and global optimum searches). The objective function for the optimum searches is preferably based on the power and/or energy delivered to the receiver(s), but can additionally or alternatively be based on any other suitable variables. For example, the objective function can be equal to the received power, which can optionally be normalized, such as by the transmitter power (e.g., and thereby equal to the power transmission efficiency). The received power can be determined (e.g., measured) at the receiver antenna, at the client device (and/or a power output configured to deliver power to a client device), at the buffer energy store, and/or at any other suitable portion of the receiver (e.g., between the antenna and the buffer energy store; between the buffer energy store and the client device or power output; between the antenna and the client device or power output, such as in embodiments with no buffer energy store; etc.). In one example, in which the receiver includes one or more dynamic impedance matches (e.g., configured to optimize power coupling from the receiver antenna(s)), the receiver continuously optimizes the dynamic impedance match(es), and transmits data representing the optimized power magnitude measured near (e.g., at the output of) the dynamic impedance match(es), such as described in U.S. Application 62/515,962, titled "System for Wireless Power Reception", and/or U.S. application Ser. No. 16/001,628, titled "System and Method for Wireless Power Reception", each of which is hereby incorporated in its entirety by this reference (e.g., as described regarding the dynamic impedance match, such as regarding the tuning network, power measurement module, and/or control network). Additionally or alternatively, the received power can be measured external the receiver (e.g., at a system element other than the receiver).

In embodiments in which the transmitter(s) transmit to multiple receivers (e.g., first receiver, second receiver, third receiver, fourth receiver, etc.), the objective function is preferably a multivariable function of the power received at each receiver (and can optionally be a vector-valued function, such as for use in multi-objective optimization). In one embodiment, the objective function for a set of n receivers is equal to:

$$\sum_{i=1}^{n} w_i f_i + P_i(|f_i - f_i^*|)$$

wherein $f_i$ is an objective function value associated with receiver i, $f_i^*$ is an optimal (e.g., observed, estimated, etc.) value of $f_i$ (e.g., the value of $f_i$ under transmission parameters for which $f_i$ is optimized), $w_i$ is a weight associated with receiver i, and $P_i$ is a penalty function associated with receiver i. The weights and/or penalty functions can be equivalent and/or different for the different receivers. In a first example, performance associated with one or more receivers is ignored (or partially ignored) by setting the associated weights and/or penalty functions to zero. In a second example, the performance associated with one or more receivers is ignored only if their associated objective functions remain within a threshold distance $T_i$ of the ideal value (e.g., a fractional amount of $f_i^*$, such as 1%, 2%, 5%, 10%, 15%, 20%, 25%, 50%, 75%, 90%, 95%, 0-5%, 5-15%, 15-45%, 45-75%, 75-95%, 95-100%, etc.), wherein the associated weights are set equal to zero and the associated penalty functions are zero for arguments less than $T_i$ and infinite for arguments greater than or equal to $T_i$. In a third example, the objective function can be a sum or average of the received power at each receiver (e.g., $w_i=1$ or $w_i=1/n$ and $P_i=0$ for all i).

In additional examples, the objective function can be optimized by a desired distribution of power delivery to each of the receivers (e.g., evenly-distributed, exceeding a minimum threshold for each receiver, a Pareto front distribution, etc.), can be determined based on receiver information (e.g., battery charge states, expected power needs, etc.), and/or can be determined based on any other suitable criteria. The searches can seek to maximize or minimize the objective function. Each search (and/or iteration of a search) can use the same objective function or different objective functions.

The objective function (e.g., for a multi-receiver system) can optionally be determined based on receiver prioritization. The receiver prioritization can include receiver priority scores, rankings, classifications (e.g., high, medium, low, ignore, etc.), and/or any other suitable prioritizations. The receiver prioritizations can be used, for example, to determine the weights and/or penalty functions of the objective function (e.g., wherein a higher-priority receiver corresponds to a higher weight than a lower-priority receiver). The prioritizations can be determined based on: expected receiver residence time (e.g., wherein a very short time corresponds to a "low" or "ignore" priority, a short time corresponds to a "moderate" priority, an intermediate time corresponds to a "high" priority, and a long time, such as a time far in excess of the time needed to substantially fully charge the receiver's battery, corresponds to a "low" or "intermediate" priority, etc.), expected time required to charge receiver battery (e.g., wherein a longer expected charging time corresponds to a higher prioritization), receiver battery state (e.g., wherein a very low battery state, such as a state in which an electronic device powered by the battery may soon power off, cease to function, and/or enter a standby mode, corresponds to a higher prioritization), user preferences, and/or any other suitable information.

Figure 2B:
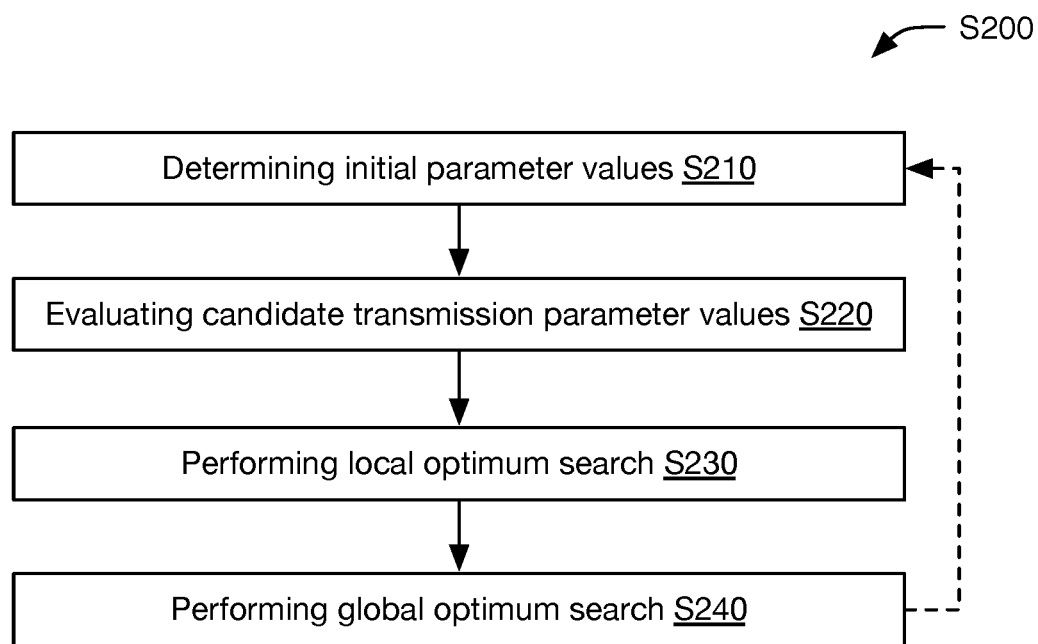

Determining transmission parameter values S200 can include determining initial parameter values S210, evaluating candidate transmission parameter values S220, performing a local optimum search S230, and/or performing a global optimum search S240 (e.g., as shown in FIG. 2B). However, S200 can additionally or alternatively include any other suitable elements.

4.2.1 Determining Initial Parameter Values.

Determining initial parameter values S210 can function to provide an initial guess and/or a starting point for the optimum search.

In a first embodiment, the initial parameter values can be predetermined and/or fixed (e.g., hardcoded). For example, the initial parameter values can correspond to beam-like patterns (e.g., most radio power directed within a narrow cone, such as a cone with a 5° aperture, around a beam, such as a beam directed normal to the antenna array, parallel an edge of the antenna array, etc.), multi-beam patterns (e.g., several beam-like patterns propagating in different directions), wide patterns (e.g., significant radio power spread over a wide distribution of angles, such as over a cone with a 90° aperture), omni-directional patterns (e.g., radiating power in a pattern with substantially cylindrical symmetry, such as radiating substantially equal power in all azimuthal directions perpendicular to an axis, such as an array normal axis), supergaining excitation patterns (e.g., configured to excite supergaining behavior in one or more supergaining structures of the receiver(s) and/or transmitter(s), such as precomputed patterns based on known and/or assumed supergaining structure types, positions, and/or orientations; such as described in M. T. Ivrlač and J. A. Nossek, "High-efficiency super-gain antenna arrays," 2010 *International ITG Workshop on Smart Antennas (WSA)*, Bremen, 2010, pp. 369-374, which is hereby incorporated in its entirety by this reference), and/or any other suitable radiation patterns. The initial parameter values can additionally or alternatively include randomly-selected values (e.g., modifying the predetermined and/or fixed values).

In a second embodiment, the initial parameter values can be can be determined based on historical data (e.g., can be equal to transmission parameter values determined in a previous performance of the method). The historical data can include data associated with the transmitter, the receiver, and/or any other transmitters, receivers, or other devices. The initial parameter values can additionally or alternatively include randomly-selected values (e.g., modifying the values determined based on historical data). In a first example of this embodiment, the initial parameter values are set equal to the most recent optimized transmission parameter values determined by the system. In a second example, the initial parameter values are set equal to the most recent optimized transmission parameter values determined by a fast search (e.g., determined by a local optimum search, wherein a global search was determined to be unnecessary). In a third example, the initial parameter values are set equal to the most recent optimized transmission parameter values corresponding to a beam-like radiation pattern. In a fourth example, the initial parameter values are set equal to optimized transmission parameter values associated with a similar arrangement (e.g., determined based on the receiver position and/or orientation, such as by an IMU). In a fifth example, the initial parameter values are determined based on the historical data using machine learning techniques (e.g., cluster algorithms, function estimation, multi-layer neural networks, etc.), such as to predict usage patterns. However, the initial parameter values can be determined based on any other suitable historical data, and/or can be determined in any other suitable manner (e.g., determined randomly).

4.2.2 Evaluating Candidate Transmission Parameter Values.

Evaluating candidate transmission parameter values S220 can function to determine the objective function value associated with the candidate transmission parameter values. Evaluating candidate values S220 can include transmitting based on the candidate values S221, measuring results of the transmission S222, and/or evaluating the objective function based on the measurement S223. S220 can additionally or alternatively include estimating the objective function value (e.g., based on historical data, by evaluating a proxy function, etc.). Evaluating candidate transmission parameter values S220 can be performed periodically, performed upon evaluation trigger event occurrence (e.g., detecting object movement within the power transmission region), and/or at any other suitable time.

Transmitting S221 preferably includes controlling one or more antennas of the transmitter antenna array (e.g., adaptive antenna array, such as a phased antenna array). Preferably, each antenna of the array is controlled independently, but some or all of the antennas can alternatively be controlled jointly, controlled in groups (e.g., hardware-defined groups and/or software-defined groups, such as described above, etc.), controlled in any other suitable manner, and/or can be not controlled. The tested antenna parameter values (e.g., parameter value set) can be the initial parameter values, be predetermined (e.g., a predetermined set of variable combinations), historic values, iteratively determined (e.g., as described below, such as regarding S230 and/or S240), and/or otherwise determined. For example, each controlled antenna can be controlled to transmit at a specified phase and/or amplitude (e.g., based on the parameter values, such as with the phase equal to the corresponding phase parameter value and/or the amplitude equal to the corresponding amplitude parameter value). However, any other suitable antenna control parameter(s) can be varied and/or tested.

Measuring results of the transmission S222 preferably includes measuring the power and/or energy received by one or more receivers. S222 can additionally or alternatively include measuring reflected and/or backscattered power (e.g., at the transmitter, at an additional sensor, etc.), and/or measuring any other suitable results of the transmission. S222 can optionally include communicating (e.g., to a coordinating device, such as a transmitter) the measured results and/or any suitable information derived based on and/or otherwise associated with the measured results (e.g., one or more datasets indicative of the measured results, such as indicative of the amount of power received by a receiver). In one embodiment, each receiver measures the power that it receives, and communicates the result of the measurement (and/or information determined based on the measurement, such as objective function values, etc.) to the transmitter. The receiver can perform measurements and/or transmit measurement results continuously, in response to requests from the transmitter (e.g., sent by the transmitter before, during, and/or in response to performing S221), at regular intervals, and/or with any other suitable timing.

The objective function can be evaluated S223 at the coordinating device, at the measurement device, and/or at any other suitable device. In a first example (e.g., in which only one receiver is within range of a transmitter), the objective function is a single-variable function (e.g., equal to the received power or power transmission efficiency). In a second example (e.g., including power transmission to multiple receivers), the objective function is a multivariable function (e.g., as described above or otherwise). However, S223 can include evaluating any suitable objective function.

Evaluating candidate values S220 preferably includes caching the evaluated parameter values and the corresponding objective function values (e.g., indexed by the parameter values), and can additionally or alternatively include caching (e.g., indexed by the parameter values) intermediary values (e.g., measured values such as power transmission and/or reception values; for a multi-receiver system, one or more individual-receiver objective function values such as power received by the receiver; etc.). The values are preferably cached by the transmitter (e.g., in response to receipt of the information from one or more receivers, in response to calculation of the values, etc.), but can additionally or alternatively be cached by one or more receivers and/or any other suitable entities. Future iterations of S220 using the same parameter values preferably include retrieving the corresponding objective function value from the cache (e.g., rather than performing S221, S222, and/or S223 such as described above, which can require 1-100 ms or more). Therefore, caching can significantly reduce the time required to evaluate candidate values S220.

In one example, including power transmission to multiple receivers, individual-receiver objective function values (e.g., power received by each individual receiver) are cached (e.g., along with or in place of the overall objective function values and/or any other suitable information associated with the parameter values) during S220. In this example, the method includes ceasing and/or modifying power transmission to and/or prioritization of a first set of one or more (but not all) of the receivers (e.g., in response to determining that a receiver is no longer within transmission range, that power delivery to a receiver has decreased such as due to movement of the receiver and/or an obstacle, that a receiver charge state is greater than a threshold value, that another receiver should be prioritized over this receiver, etc.). In response, the method can include determining a modified transmission parameter value set (e.g., not optimizing for delivery to receivers of the first set, optimizing for the changed reception state of receivers of the first set, etc.), preferably relying on the cached values associated with the one or more receivers not in the first set (e.g., receivers whose state has not changed significantly). In this example, the cached values associated with the receivers of the first set can optionally be ignored, discarded, and/or otherwise handled (e.g., because the values do not correspond to the present physical state of the system, and so may not be useful for determining efficient transmission parameters), but can alternatively be preserved and/or used in any other suitable manner. In a specific example, optimized transmission parameters for delivering power to three receivers are determined, and the individual-receiver objective function values determined during the search for the optimized transmission parameters are cached. In response to the first receiver moving out of effective charging range of the transmitter, new transmission parameters for delivering power to the second and third receivers are determined, preferably based (in part or in full) on the cached values associated with the second and third receiver objective functions.

However, S220 can additionally or alternatively include any other suitable elements performed with any suitable timing.

The candidate values are preferably evaluated S220 during the optimum searches (e.g., as described below, such as regarding S230 and/or S240). However, they can additionally or alternatively be evaluated S220 at any other suitable time.

4.2.3 Performing a Local Optimum Search.

Performing a local optimum search S230 can function to quickly determine potential parameter values (e.g., a locally-optimized parameter value set, such as an optimal parameter value set near an initial parameter value set). For example, a local optimum search can be sufficient if the search space around the initial transmission parameter values is convex/quasi-convex, and that convex/quasi-convex region contains a satisfactory objective function value (e.g., the global optimum, a value above a minimum threshold or below a maximum threshold, a value within a threshold of a limit such as the global optimum or theoretical limit, etc.). If the local optimum search is sufficient (e.g., finds a satisfactory objective function value), the method can be performed much faster than if a global optimum search is employed.

The local optimum search (e.g., maximum search, minimum search) can employ any suitable local search algorithm(s) (e.g., gradient-based algorithm such as gradient descent, conjugate gradient descent, etc.; gradient-free algorithm such as Nelder-Mead, adaptive meshing, etc.), and/or any other suitable algorithms. Performing the local optimum search S230 preferably includes repeatedly evaluating candidate transmission parameter values S220 (e.g., evaluating S220 for each set of candidate transmission parameter values explored by the search). However, S230 can additionally or alternatively include any other suitable elements, and can be performed in any other suitable manner.

A local search is preferably performed in response to determining initial parameter values S210 (e.g., beginning the search with the initial parameter values), and can additionally or alternatively be performed during a global optimum search (e.g., as described below regarding S240) and/or at any other suitable times.

4.2.4 Performing a Global Optimum Search.

Performing a global optimum search S240 can potentially function to determine superior transmission parameter values (e.g., an optimized parameter value set). The global search is preferably performed S240 in response to completion of the initial local search (e.g., beginning the search with the optimal parameter values found by the local search), but can additionally or alternatively be performed in response to determining initial parameter values S210 (e.g., beginning the search with the initial parameter values) and/or at any other suitable time.

A global search is preferably performed S240 only if the global search is likely to be beneficial. For example, the global search can be performed if the result of the local search is poor (e.g., the maximum objective function value found is less than a threshold objective function value), if the global search is expected to yield a significant improvement over the local search (e.g., based on the pattern of objective function values determined during the local search), if the receiver is expected to remain in range for an extended period of time (e.g., long enough to justify a reduction in charging efficiency during global search performance), and/or based on any other suitable criteria. However, the global search can additionally or alternatively be performed under any other suitable circumstances (e.g., can be performed in all cases).

The global optimum search (e.g., maximum search, minimum search) preferably employs a stochastic search approach (e.g., particle swarm optimization, simulated annealing, evolutionary algorithms such as genetic algorithms, memetic algorithms, dynamic relaxation, ant colony optimization, hill climbing with random restarts, stochastic tunneling, tabu search, reactive search optimization, etc.). Especially for the large search spaces often encountered in this method, stochastic search approaches can typically converge far more quickly than deterministic approaches. In embodiments including concurrent power transmission to multiple receivers, the global optimum search can employ a multi-objective search approach (e.g., Pareto Simulated Annealing (PSA), Multi-objective Simulated Annealing (MOSA), Multi-objective Genetic Local Search (MOGLS), Modified Multi-objective Genetic Local Search (MMOGLS), Non-dominated Sorting Genetic Algorithm (NSGA), Strength Pareto Evolutionary Algorithm (SPEA), etc.). However, the global search can additionally or alternatively employ deterministic search approaches and/or any other suitable algorithms.

Initial conditions (e.g., initial particle positions for particle swarm optimization) for the global search can be predetermined (e.g., hardcoded), determined randomly, based on (e.g., equal to, randomly distributed near, etc.) previously-determined transmission parameter values (e.g., previous optima, results of the most recent local optimum search, etc.), can be determined as described above (e.g., regarding S210), and/or can be determined in any other suitable manner. The global search can be terminated after a predetermined amount of iterations or elapsed search time (e.g., fixed amount, amount determined based on factors such as expected receiver residence time, etc.), after finding a satisfactory objective function value (e.g., as described above, such as regarding the local search), and/or at any other suitable time.

In one embodiment, the global optimum search is performed S240 using particle swarm optimization (PSO). PSO can include determining a population of particles, each associated with a position in the search space (a set of candidate transmission parameter values) and a velocity at which the position is altered (e.g., initially equal for all particles, such as zero or maximum based on the search space boundaries; randomly determined for each particle; etc.), and then repeatedly (e.g., at each time step), for each particle of the population: evaluating S220 the values associated with the particle, updating the velocity of each particle based on a velocity update function, and updating the particle position based on the updated velocity. The velocity update function for a particle i, which is used at time step t to determine $v_{t+1}$, preferably depends on the current particle velocity $v_{t,i}$ and position $x_{t,i}$, the best position (e.g., position corresponding to the highest or lowest value of the objective function $f$) that the particle has visited $p_i$, and the best position that any particle of the population has visited g, more preferably tending to drive the particle toward $p_i$ and g. For example, the velocity update function can be: $v_{t+1,i} = w\, v_{t,i} + \varphi_p\, r_p\, (p_i - x_{t,i}) + \varphi_g\, r_g\, (g - x_{t,i})$, wherein $\omega$ is an inertial weight, $\varphi_p$ and $\varphi_g$ are parameters (e.g., constant predetermined parameters), and $r_p$ and $r_g$ are random numbers (e.g., between 0 and 1). The particle position is preferably updated by adding the updated velocity to the current particle position to determine the updated particle position, but can additionally or alternatively be updated in any other suitable manner.

The PSO algorithm preferably includes (e.g., in the update function) one or more inertial weights, which can function to improve the search resolution. The inertial weight is preferably determined chaotically (e.g., for iteration-dependent inertial weights $\omega$ between 0 and 1, the subsequent inertial weight $\omega_{t+1}$ can be determined based on the current inertial weight $w_t$ by a chaotic relation, such as based on the equation $w_{t+1} = w_t(1-w_t)$), but can additionally or alternatively be constant, random, sigmoid increasing, sigmoid decreasing, linear decreasing, oscillating, global-local best (e.g., for particle-dependent inertial weights $\omega$, the inertial weight $\omega_i$ for particle i is determined based on the equation $$w_i = a + \frac{g_{best}}{p_{i,best}},$$

wherein $p_{i,best}$ is the best value encountered by particle i, $g_{best}$ is the best value encountered by any particle of the swarm, and $\alpha$ is a constant such as 1.1), simulated annealing-based (e.g., for iteration-dependent inertial weights $\omega$ between $\omega_{min}$ and $\omega_{max}$, $w_t$ $w_{min}+(w_{max}-w_{min})\times\lambda^{t-1}$, wherein A, $\omega_{min}$, and $\omega_{max}$ are all between 0 and 1), natural exponent, logarithm decreasing, exponent decreasing, adaptively determined, determined based on results of an inertial weight optimization algorithm, or any suitable combination thereof. However, the PSO algorithm can include any other suitable inertial weight(s). The PSO algorithm preferably includes (e.g., in the update function) one or more fitness-distance-ratio terms (e.g., terms including factors such as $$\frac{|f(x_i) - f(x_j)|}{\|x_i - x_j\|},$$

such as $$\max_{j \neq i} \frac{|f(x_i) - f(x_j)|}{\|x_i - x_j\|}$$

for j a particle of the population), which can function to reduce premature convergence during the search. The PSO algorithm can additionally or alternatively include any other suitable features.

Performing the global optimum search S240 preferably includes repeatedly evaluating candidate transmission parameter values S220 (e.g., evaluating S220 for each set of candidate transmission parameter values explored by the search). Performing the global search S240 can optionally include modifying the objective function and/or approximating objective function values (e.g., to simplify evaluation and/or accelerate global search convergence).

Figure 3:
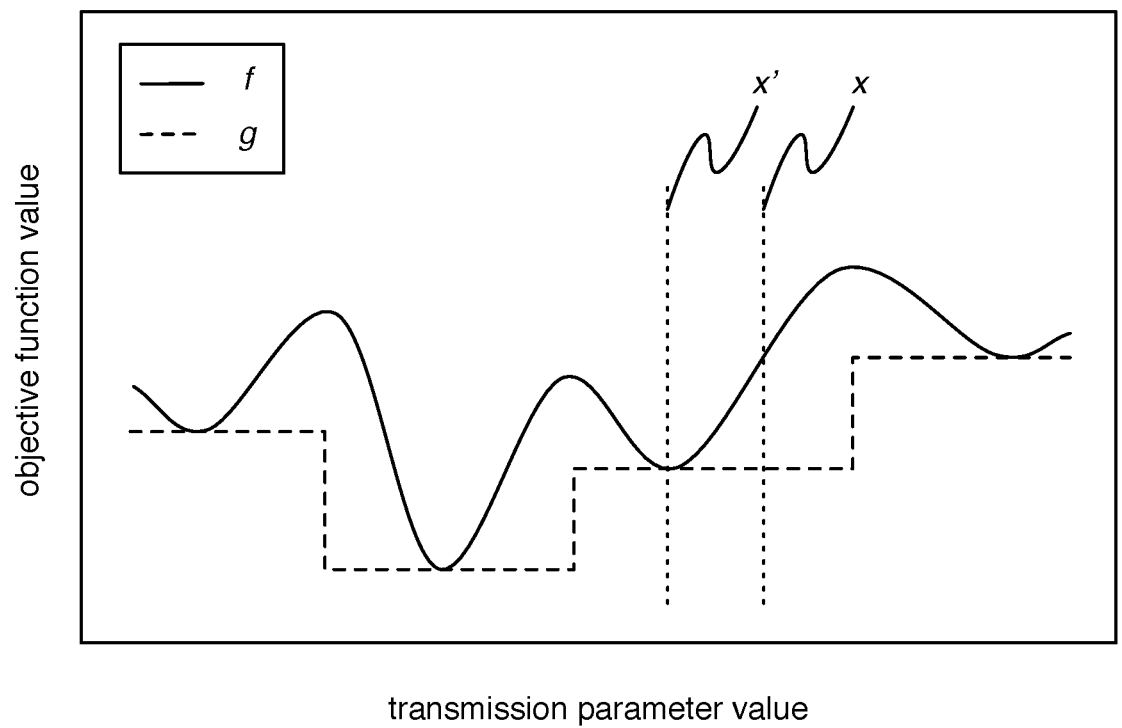
FIG. 3 is a representation of an example of an objective function and a modified version of the objective function.
Figure 5A:
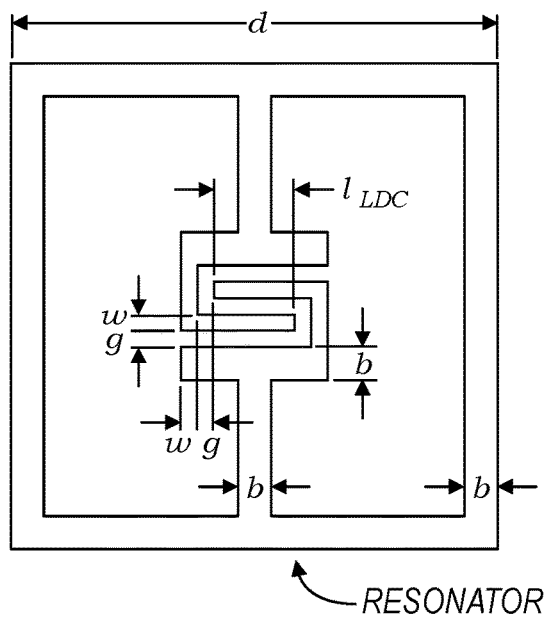
FIGS. 5A-5D are plan views of specific examples of an electro-inductive-capacitive resonator.
Figure 5B:
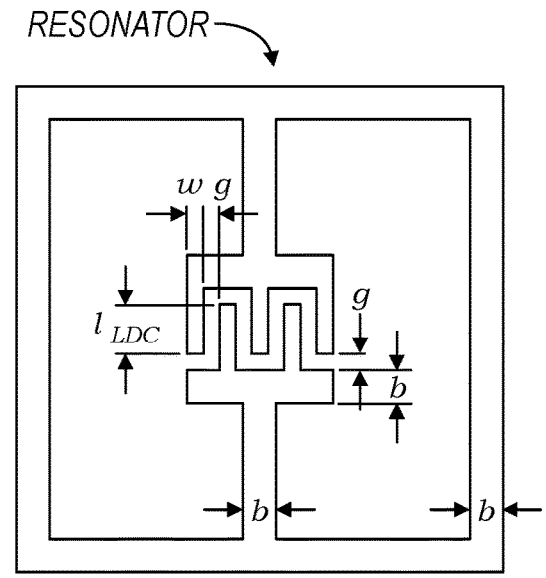
Figure 5C:
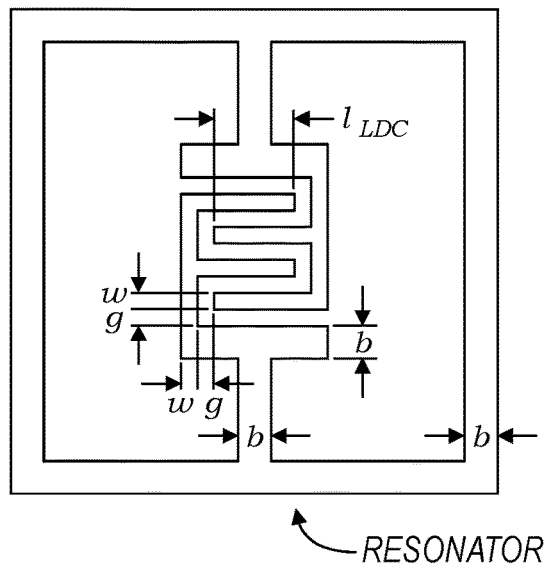
Figure 5D:
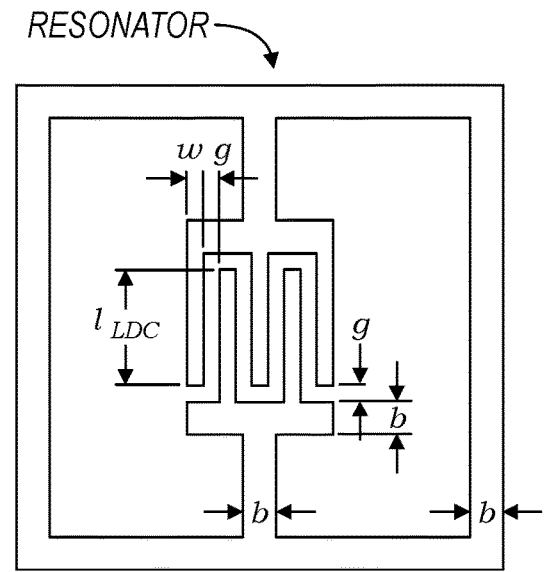

In one embodiment, the original objective function $f$ is basined to generate a modified objective function g, wherein the objective function values are replaced by the minimum value of the basin in which they sit (or analogously, for an objective function to be maximized, the maximum value of the hill on which they sit), such as shown in FIG. 3. In this embodiment, evaluating the modified objective function at a point x (e.g., at a set of candidate transmission parameter values) can include performing a local optimum search starting at the point, using the original objective function (e.g., as described above regarding S230), wherein the value of the modified objective function at the point is equal to the value of the original objective function at the local minimum x': $g(x) = f(x')$.

A second embodiment includes determining local approximations of the objective function (e.g., the original objective function $f$ is approximated to generate a modified objective function g, wherein the objective function values are replaced by the approximated values). For example, the objective function values near a particular point (e.g., a set of candidate transmission parameter values) can be approximated using one or more local approximation methods, such as linear regression, quadratic approximation, radial basis function interpolation, thin-plate spline interpolation, and/or any other suitable approximation methods. In a specific example, the objective function value (and/or its derivative(s) with respect to one or more parameters) is determined at additional locations (in the transmission-parameter space) near the particular point, and these values are used to determine a local approximation (e.g., interpolated within the region of tested additional locations, extrapolated beyond the region, etc.) of the objective function (e.g., wherein the local approximation can be treated as a known objective function value, wherein the local approximation informs subsequent iterations of the optimum search(es), etc.).

These embodiments preferably includes caching of the modified objective function values (and/or the original objective function values) and the points associated with them (e.g., the points evaluated during the local optimum search and/or local approximation determination, the regions around those points, the bounds or known extent of the basin or hill, etc.). In subsequent iterations, the cached values can be retrieved, which may reduce the need to evaluate points via power transmission and measurement. The objective function can additionally or alternatively be modified and/or approximated in any other suitable way (or can remain unmodified). However, S240 can additionally or alternatively include any other suitable elements, and can be performed in any other suitable manner.

4.3 Transmitting Power Based on the Transmission Parameter Values.

Transmitting power based on the transmission parameter values S300 can function to wirelessly deliver power to the receiver. Power is preferably transmitted S300 in response to determining the transmission parameter values S200, but can additionally or alternatively be performed at any other suitable time. Power is preferably transmitted S300 throughout the receiver's residence time within range of the transmitter, but can additionally or alternatively be transmitted intermittently, according to a schedule, based on the receiver operation parameters (e.g., state of charge), and/or with any other suitable timing. The power is preferably transmitted as one or more pure-tone (or substantially pure-tone, such as defining a bandwidth less than a threshold bandwidth) signals (e.g., which can be beneficial in embodiments that employ one or more supergaining structures and/or other narrow bandwidth antennas), but can additionally or alternatively be transmitted in any other suitable form (e.g., in embodiments that employ wider-bandwidth antennas, in embodiments in which communication signals are transmitted along with the power, etc.). In a first specific example, the radiation has a GHz-scale frequency (e.g., 5-10 GHz, such as 5.8 GHz and/or greater than 5.8 GHz). In a second specific example, the radiation has a hundreds of MHz-scale frequency (e.g., 100-500 MHz, such as 433 MHz and/or less than 433 MHz). However, the power can additionally or alternatively be received in any other suitable form.

Transmission parameter value determination S200 (e.g., local searching S230, global searching S240, etc.) can optionally be repeated during power transmission S300 (e.g., wherein power transmission is temporarily halted during parameter value determination). Repeated performances of S200 preferably use the most recently determined transmission parameter values as initial values, but can additionally or alternatively use any other suitable values (e.g., as done during the initial performance of S200, using other previously-determined values, etc.). S200 can be repeated in response to detecting a change (e.g., greater than an absolute or relative threshold) in delivered power, detecting movement (e.g., based on receiver and/or transmitter measurements, such as IMU measurements), detecting an additional receiver and/or transmitter in proximity to the system S100, receiving a user input, can be repeated periodically (e.g., at a predetermined rate; at a dynamically-determined rate, such as determined based on an observed and/or expected temporal and/or spatial stability of the system and/or its performance, preferably wherein lower stability corresponds to a more rapid rate; etc.), sporadically, randomly, and/or can be repeated at any other suitable time. However, power can be transmitted S300 in any other suitable manner, and the method can additionally or alternatively include any other suitable elements performed in any other suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system for wireless power transmission, comprising:
a power transmitter comprising a plurality of transmission elements and a wireless communication receiver; and
a power receiver comprising a power measurement element and a wireless communication transmitter;
wherein:
the system is configured to perform a local optimum search based on an objective function associated with the receiver, wherein, for each of a plurality of test configurations, the system evaluates the objective function at the test configuration, wherein:
the power transmitter configures the plurality of transmission elements based on the test configuration;
the power transmitter wirelessly transmits power while the plurality of transmission elements is configured based on the test configuration;
the power receiver receives power while the plurality of transmission elements is configured based on the test configuration;
based on the power received at the power receiver while the plurality of transmission elements is configured based on the test configuration, the power measurement element determines a power reception metric;
the power receiver transmits the power reception metric to the wireless communication receiver via the wireless communication transmitter;
the power transmitter receives the power reception metric via the wireless communication receiver; and
the system determines a value of the objective function based on the power reception metric;
the system is configured to select a selected configuration from the plurality of test configurations based on the local optimum search; and
the power transmitter is configured to, in response to the system selecting the selected configuration:
configure the plurality of transmission elements based on the selected configuration; and
wirelessly transmit power to the power receiver while the plurality of transmission elements is configured based on the selected configuration.

2. The system of claim 1, wherein the local optimum search is based further on a gradient-free local search algorithm.

3. The system of claim 2, wherein the gradient-free local search algorithm comprises at least one of: a Nelder-Mead algorithm or an adaptive meshing algorithm.

4. The system of claim 1, further comprising a second power receiver comprising a second power measurement element and a second wireless communication transmitter, wherein the transmitter is further configured to wirelessly transmit power to the second receiver while the plurality of transmission elements is configured based on the selected configuration.

5. The system of claim 4, wherein, for each test configuration of the plurality:
the second power receiver receives second power while the plurality of transmission elements is configured based on the test configuration;
based on the second power, the second power measurement element determines a second power reception metric;
the second power receiver transmits the second power reception metric via the second wireless communication transmitter; and
the power transmitter receives the second power reception metric via the wireless communication receiver.

6. The system of claim 5, wherein the system is configured to perform the local optimum search based further on the second power receiver.

7. The system of claim 6, wherein the objective function is based further on the second power reception metric.

8. The system of claim 7, wherein the objective function is related to $w_1 f_1 + P_1(|f_1 - f^*_1|) + w_2 f_2 + P_2(|f_2 - f^*_2|)$, wherein $w_1$ is a receiver weighting associated with the power receiver, f is the power reception metric, $f_1^*$ is a maximum power reception metric estimated to be achievable at the power receiver, P is a penalty function associated with the power receiver, $w_2$ is a second receiver weighting associated with the second power receiver, $f_2$ is the second power reception metric, $f_2^*$ is a second maximum power reception metric estimated to be achievable at the second power receiver, and $P_2$ is a second penalty function associated with the second power receiver.

9. The system of claim 5, wherein, for a first test configuration of the plurality of test configurations, the power transmitter receives the second power reception metric from the second power receiver, via the power receiver.

10. The system of claim 5, wherein the power transmitter is further configured to:
store a set of test metrics, wherein, for each test configuration of the plurality, the power transmitter stores, in association with the test configuration, a respective test metric associated with the second power reception metric;
determine a deprioritization of power transmission to the power receiver; and
in response to determining the deprioritization:
based on the set of test metrics and a second objective function associated with the second power receiver, determine an alternate configuration;
configure the plurality of transmission elements based on the alternate configuration; and
wirelessly transmit power to the second power receiver while the plurality of transmission elements is configured based on the alternate configuration.

11. The system of claim 10, wherein determining the deprioritization comprises determining that the wireless communication transmitter is not available for communication with the wireless communication receiver.

12. The system of claim 5, wherein the power receiver is not mechanically coupled to the second power receiver.

13. A system for wireless power transmission, comprising:
a power transmitter comprising a plurality of transmission elements and a wireless communication receiver; and
a power receiver comprising a power measurement element and a wireless communication transmitter;
wherein:
the system is configured to perform a global optimum search based on an objective function associated with the receiver, wherein, for each of a plurality of test configurations, the system evaluates the objective function at the test configuration, wherein:
the power transmitter configures the plurality of transmission elements based on the test configuration;

the power transmitter wirelessly transmits power while the plurality of transmission elements is configured based on the test configuration;

the power receiver receives power while the plurality of transmission elements is configured based on the test configuration;

based on the power received at the power receiver while the plurality of transmission elements is configured based on the test configuration, the power measurement element determines a power reception metric;

the power receiver transmits the power reception metric to the wireless communication receiver via the wireless communication transmitter;

the power transmitter receives the power reception metric via the wireless communication receiver; and the system determines a value of the objective function based on the power reception metric;

the system is configured to select a selected configuration from the plurality of test configurations based on the local optimum search; and the power transmitter is configured to, in response to the system selecting the selected configuration:

configure the plurality of transmission elements based on the selected configuration; and wirelessly transmit power to the power receiver while the plurality of transmission elements is configured based on the selected configuration.

14. The system of claim 13, wherein the global search comprises a stochastic global search.

15. The system of claim 14, wherein the system is configured to perform the stochastic global search based on at least one of: a particle swarm optimization approach, a simulated annealing approach, an evolutionary algorithm, a memetic algorithm, a dynamic relaxation approach, an ant colony optimization approach, a hill climbing with random restarts approach, a stochastic tunneling approach, a tabu search, or a reactive search optimization approach.

16. The system of claim 13, wherein:

while wirelessly transmit power from the power transmitter to the power receiver, the system is further configured to monitor power transmission efficiency to the power receiver;

in response to a reduction in power transmission efficiency to the power receiver, the system is further configured to perform a local optimum search, around the selected configuration in the configuration parameter space, based on the objective function; and the system is further configured to determine a neighboring configuration based on the local optimum search.

17. The system of claim 16, wherein the system is further configured to:

determine whether the value of the objective function at the neighboring configuration is less than a threshold value; and if the value of the objective function at the neighboring configuration is less than the threshold value:

perform a second global search, in the configuration parameter space, based on the objective function;

based on the second global search, select a second configuration;

configure the plurality of transmission elements based on the second configuration; and wirelessly transmit power to the power receiver while the plurality of transmission elements is configured based on the second transmission configuration.

18. The system of claim 17, wherein the system is further configured to, if the value of the objective function at the neighboring configuration is greater than the threshold value:

configure the plurality of transmission elements based on the neighboring configuration; and wirelessly transmit power to the power receiver while the plurality of transmission elements is configured based on the neighboring configuration.

19. The system of claim 13, further comprising a second power receiver comprising a second power measurement element and a second wireless communication transmitter, wherein the transmitter is further configured to wirelessly transmit power to the second receiver while the plurality of transmission elements is configured based on the selected configuration.

20. The system of claim 19, wherein, for each test configuration of the plurality:

the second power receiver receives second power while the plurality of transmission elements is configured based on the test configuration;

based on the second power, the second power measurement element determines a second power reception metric;

the second power receiver transmits the second power reception metric via the second wireless communication transmitter; and the power transmitter receives the second power reception metric via the wireless communication receiver.

\* \* \* \* \*